United States Patent
Stackhouse

[15] 3,656,519
[45] Apr. 18, 1972

[54] AUXILIARY TOOL DEVICE
[72] Inventor: James L. Stackhouse, Florissant, Mo.
[73] Assignee: Emerson Electric Co., St. Louis, Mo.
[22] Filed: May 6, 1970
[21] Appl. No.: 35,152

[52] U.S. Cl....................................143/159 C, 143/159 V
[51] Int. Cl........................................................B27g 19/04
[58] Field of Search............143/159 R, 159 C, 159 D, 159 E, 143/159 G, 159 T, 159 U, 159 V

[56] References Cited

UNITED STATES PATENTS 2,926,709 3/1960 Kaley..................................143/159 R
2,823,711 2/1958 Kaley..................................143/159 C

FOREIGN PATENTS OR APPLICATIONS 1,483,714 5/1967 France..............................143/159 V Primary Examiner—Donald R. Schran
Attorney—William R. O'Meara

[57] ABSTRACT

An auxiliary tool device for power driven saw is provided which includes a tool holder carrying a rotatable spreader and pivotal anti-kickback pawls. The holder is mounted to one side of the saw cover and adjustably movable along an arc of a circle having a center at the axis of the saw blade to maintain the spreader and pawls spaced the same distance from the saw blade for each adjusted position thereof.

13 Claims, 7 Drawing Figures

INVENTOR
JAMES L. STACKHOUSE
BY William R. O'Meara

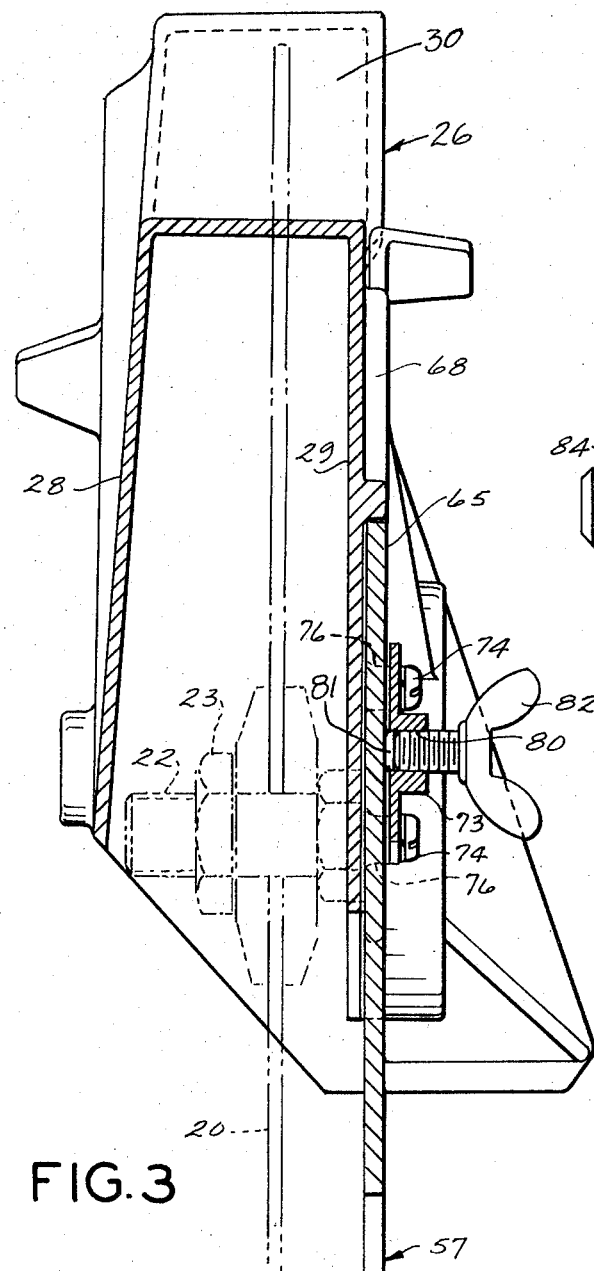
FIG. 3
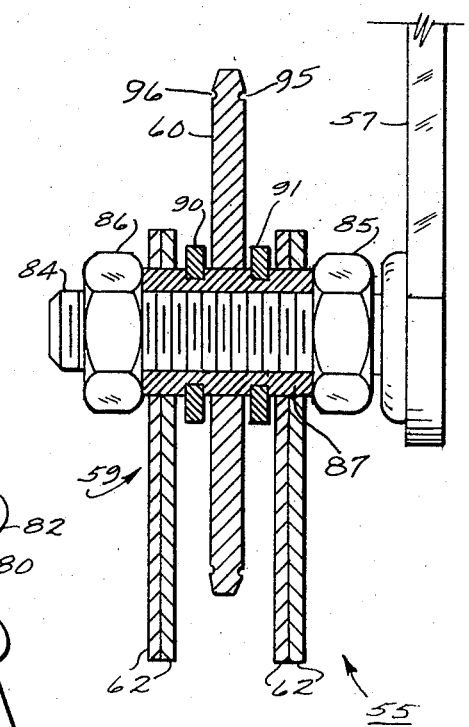
FIG. 4
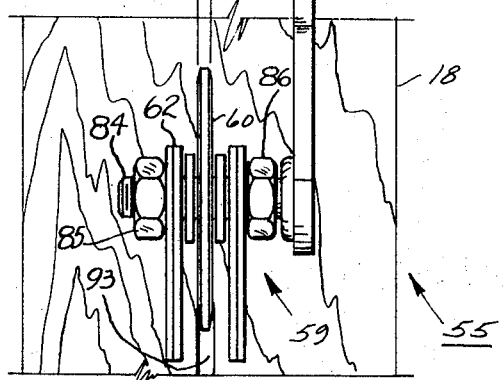

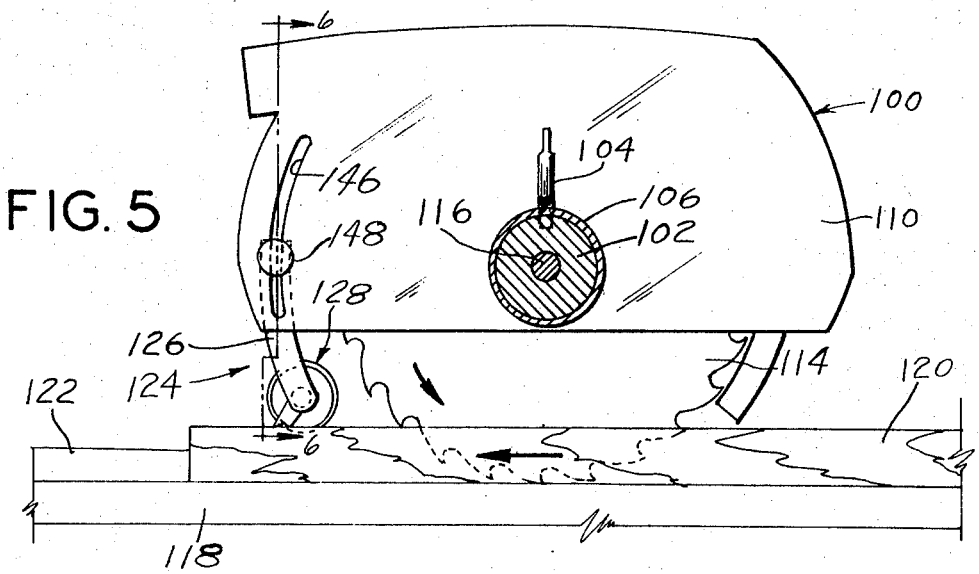
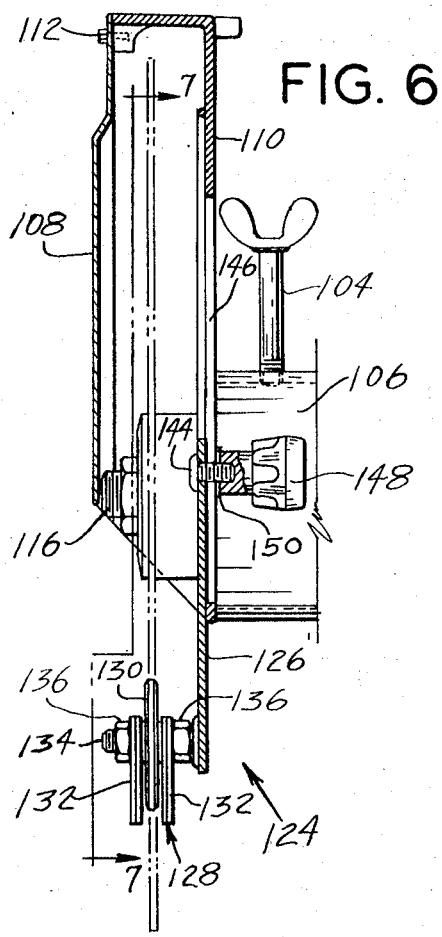
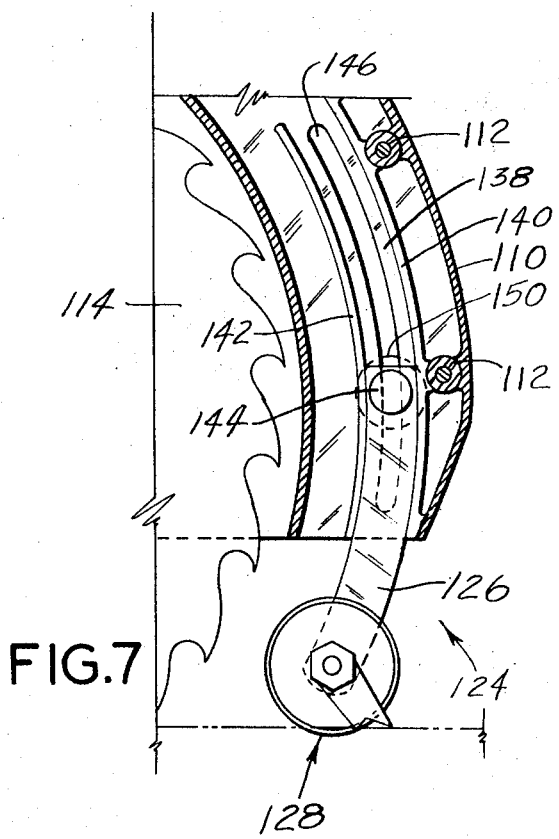

3,656,519

AUXILIARY TOOL DEVICE

BACKGROUND OF THE INVENTION

This invention relates to an auxiliary tool device and more particularly to an auxiliary tool device for a power driven rotary tool.

In the past, auxiliary tool devices, for example, the spreader and anti-kickback tools used with power driven rotary saws, such as with a radial-arm saw, were not entirely satisfactory. Generally, the spreader and anti-kickback device was connected to the end of an adjustable straight rod that was usually connected to a portion of the housing or saw blade cover at a point radially outwardly of the saw blade. The spreader which moves within the kerf was often a blade fixed to the rod which was aligned with the saw blade and used to maintain the cut portions of the workpiece apart to reduce friction between the blade and workpiece. The anti-kickback device was usually in the form of pivotal pawls having points engageable with the workpiece to prevent undesirable return movement of the workpiece during cutting operations. The rod was linearly movable toward and away from the work table so as to adjust the position of the spreader and anti-kickback device in order to accommodate workpieces of various sizes.

Such prior act constructions had the disadvantage that the spreader and anti-kickback device was not equally effective for the different adjustments throughout the capacity range of the saw. This is because linear adjustment of the rod caused the distance between the spreader and anti-kickback device and the saw blade to differ over the range of adjustments. Generally, the spreader and anti-kickback device was at a relatively large distance from the blade and was not therefor operational until after a considerable length of workpiece was cut. Also, the rod was an obstruction to light and the operator's vision. In addition, there was a relatively large amount of friction between the workpiece and the fixed spreader, especially where there are variations in position of kerf due to warpage and stress-relieving situations. Furthermore, several adjustments of the rod for a new workpiece were usually required before the rod was properly adjusted.

SUMMARY OF THE INVENTION

Accordingly, it is an object of the present invention to provide a novel auxiliary tool device for a rotary tool which substantially obviates the above-mentioned disadvantages.

It is another object of the present invention to provide an auxiliary tool device for a rotary tool assembly that has an anti-kickback and/or spreader means that are substantially equally effective throughout the entire capacity range of the rotary tool assembly.

Another object is to provide an auxiliary tool for a rotary workpiece cutting tool assembly having a spreader and/or an anti-kickback device that substantially does not hinder the vision of the operator or light reaching the cutting area.

Another object is to provide a spreader for a rotary saw wherein the spreader produces a reduced amount of friction during sawing operations.

Another object is to provide an auxiliary tool for a rotary saw having a spreader and/or a anti-kick device which is maintained efficiently very close to the saw blade and at substantially the same distance therefrom for different positions of adjustment.

Still another object is to provide a combined spreader and anti-kickback device wherein means on the spreader are provided so as to automatically provide means for indicating proper adjustment of the anti-kickback device.

Still another object is to provide a spreader for a radial-arm saw which is laterally adjustable for various types of saw blades.

These and other objects and advantages will be apparent from the following detailed description and drawings.

In accordance with one aspect of the present invention an auxiliary tool device for a rotary tool is provided which includes a holder, and tool means connected to the holder adjacent the periphery of the rotary tool, the holder being adjustably movable to adjustably move the tool means so as to maintain it substantially the same distance from the rotary tool for each adjusted position thereof.

BRIEF DESCRIPTION OF THE DRAWINGS

FIG. 3 is a sectional view taken along line 3—3 of FIG. 2;

FIG. 4 is a sectional view taken along the line 4—4 of FIG. 2;

FIG. 5 is a partial elevational view illustrating another embodiment of the invention;

FIG. 6 is an enlarged sectional view taken along line 6—6 of FIG. 5; and

FIG. 7 is a fragmentary sectional view taken along the line 7—7 of FIG. 6.

Corresponding reference characters indicate corresponding parts throughout the several views of the drawings.

DESCRIPTION OF THE PREFERRED EMBODIMENT

Figure 1:
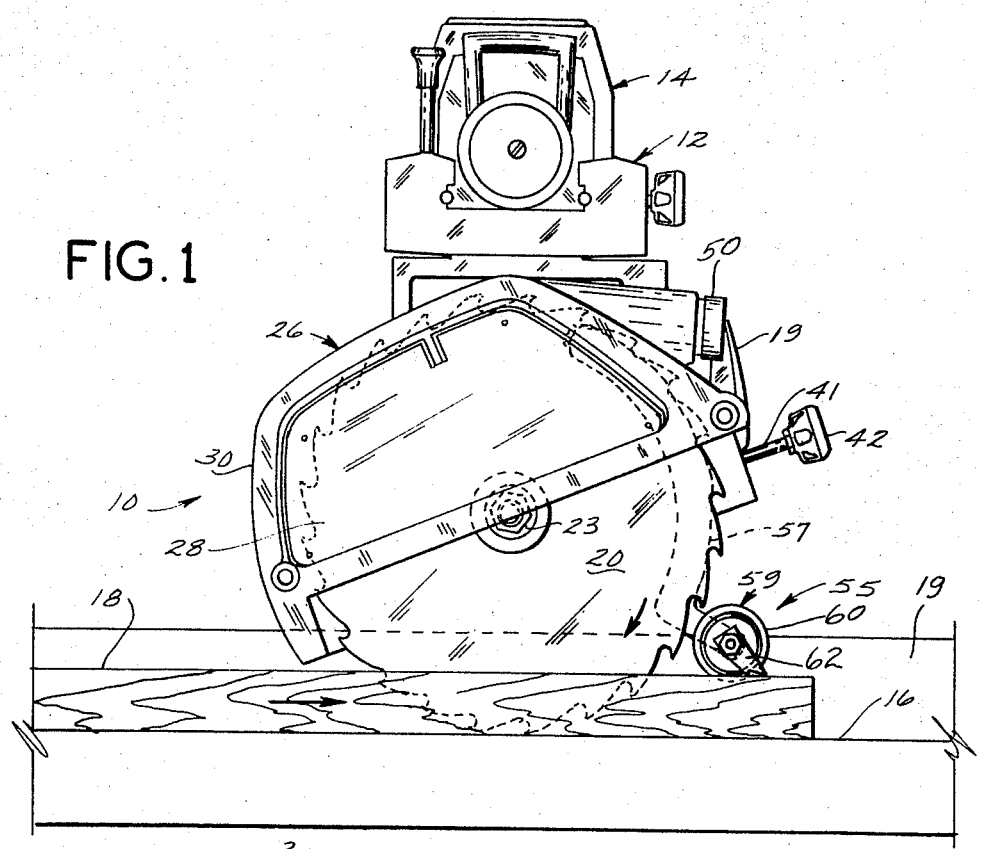
FIG. 1 is a partial elevational end view of a radial arm saw assembly incorporating an auxiliary tool device in accordance with the present invention.
Figure 2:
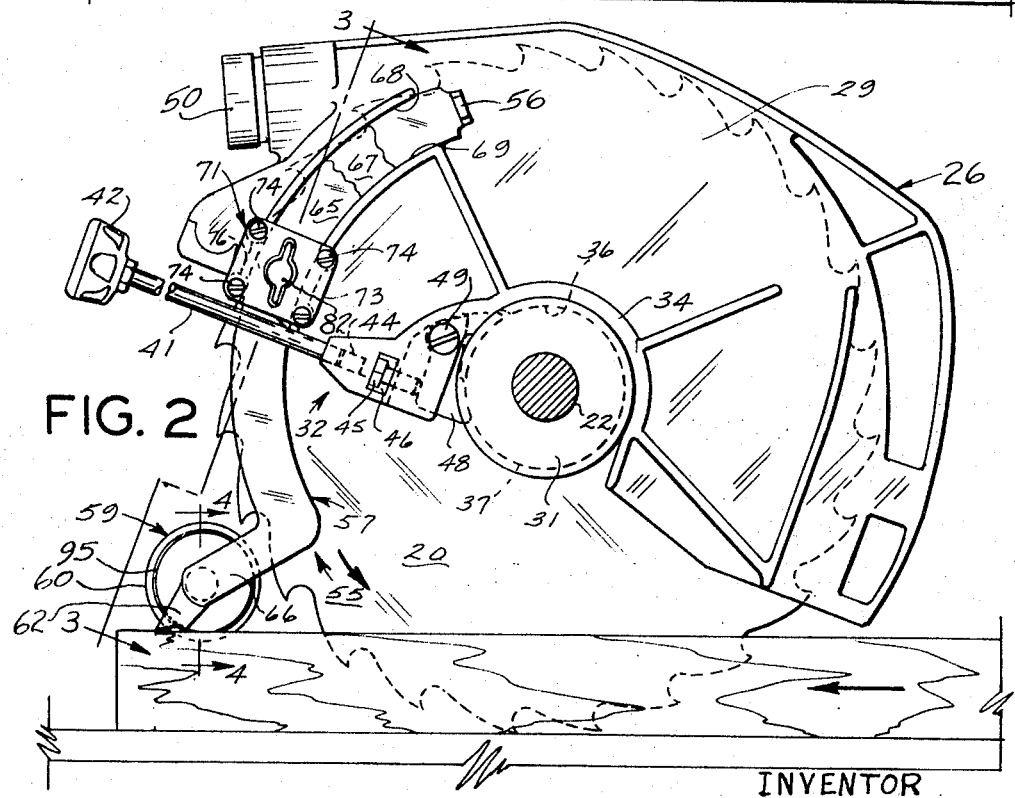
FIG. 2 is an enlarged partial elevation view of a portion of the saw assembly of FIG. 1 showing the reverse side of the auxiliary tool device.

Referring now to the drawings and particularly to FIGS. 1 and 2, a power driven rotary tool assembly 10, illustrated as a radial-arm type saw assembly, is shown including a housing 12 mounted for sliding movement, for adjustment purposes in rip type operations, on a saw assembly arm 14 above a table 16 which supports a workpiece shown, for example, as a piece of wood 18 and a fence 19. The housing 12 includes an electric motor (not shown) for driving a rotary tool shown as a disk or circular saw blade 20 connected to a motor shaft 22 by means of a nut 23, and a dust cover or guard 26.

The guard 26 is a hollow, open-ended, generally semi-circular member including pair of opposed spaced side walls 28 and 29 and a peripheral wall 30 shown integrally connected with the side walls 28 and 29. As seen in FIG. 2, the guard is connected to a collar 31 of the housing 12 for adjustable, limited rotation about the axis of rotation of blade 20; however, where desired, the guard 26 may be non-adjustable or non-rotatable. A conventional guard clamping or locking device 32 is shown for adjustably positioning the cover relative to the workpiece 18. The inner side wall 29 of the guard is provided with an open hub portion 34 having an arcuate key 36 which fits in an arcuate groove 37 formed in collar 31. The locking device includes a threaded shaft or rod 41 having a knob 42 and which extends through a generally radial opening 44 in the side wall 29, and a nut 45 disposed in a cross-slot 46 intersecting the opening 44 and preventing rotation of nut 45. The end of the rod 41 engages a locking element 48 that is pivotally connected to guard 26 by a pin or screw 49. Element 48 is adapted to enter groove 37, as seen in FIG. 2. Rotation of shaft 41 in one direction permits relative movement of the locking element 48 and guard 26 so that the guard can be adjustably rotated or taken off of the assembly 10. When the guard 26 is adjustably rotated to a desired position, the shaft 41 is rotated in the opposite direction to apply a force to the element 48 urging it against the bottom of the groove 37 to hold the guard 26 against rotation.

The guard 26 is shown as a single piece metal casting which covers or receives approximately one-half of the saw blade 20. An integral dust outlet is indicated at 50 and which may be connected to dust collector such as a device of the vacuum type.

Connected to the tool assembly 10, as seen also in FIGS. 3 and 4, is an auxiliary tool device 55 adapted to be used during a rip type cutting operation. The device 55 is shown including an adjustable auxiliary tool support or tool holder member 57 having connected thereto a workpiece engaging tool 59 adjacent the outer periphery of blade 20 and including a spreader 60 which is shown in the form of a rotatable disc, and anti-kickback elements 62, shown as pawls. The tool holder 57 includes an arcuate portion 65, a radial portion 66 shown integral therewith and extending radially outwardly beyond the guard 26 and outer periphery of the blade 20, and a handle 56 in the form of an integral tab.

The holder 57 is guided for arcuate or circular movement substantially about the axis of rotation of blade 20 by a guide shown in the drawing in the form of a channel 67 integral with side wall 29 and having opposed arcuate walls 68 and 69. The holder 57 is releasably held in an adjusted place by a clamping device 71 shown including a plate 73 connected to the guard side wall 29 over the channel 67 by means of four screws 74. The plate 73 is disposed on four threaded pads 76 integral with the side wall 29 which receives the screws 74. The plate 73 is provided with a central threaded opening 80, as seen in FIG. 3, which receives a slidable pad 81 and an adjustable clamping member 82 shown as a winged screw which, when tightened down, engages the pad 81 to urge it against the holder 57 to releasably lock the holder in an adjusted position. Pad 81 prevents marring of the holder 57 by screw 82.

Connected to the radial portion 66 of the holder 57, such as by welding, is a tool supporting rod or shaft 84 which extends parallel to the axis of rotation of the saw blade 20 and spaced radially outwardly from the periphery of the blade.

As seen in FIGS. 3 and 4, the shaft 84 is threaded to receive a pair of inner and outer nuts 85 and 86 between which is disposed a bushing 87, the spreader 60, and a pair of anti-kickback pawls 62 on each of the opposite sides of the spreader 60. The bushing 87 is provided with a pair of annular slots receiving a pair of snap-rings or retaining rings 90 and 91 to maintain the spreader 60 and pawls 62 spaced from each other. The spreader 60 and each of the pawls 62 are rotatable on bushing 87. Also, the spreader 60 is axially movable a limited amount on bushing 87 between the rings 90 and 91 so that the spreader is self-aligning and is able to roll in and follow the kerf, indicated at 93 in FIG. 3, even though there are variations in the position of the kerf due to warpage or stress-relieving effects.

The anti-kickback pawls 62 are shown as conventional two-pointed pawls which allow the workpiece 18 to move in one direction, the direction indicated by the arrows in FIGS. 1 and 2, but prevent movement of the workpiece in the opposite direction.

The spreader 60 is provided with circular marks or grooves 95 and 96 which are located a predetermined distance from the periphery thereof. When the holder 57 is positioned such that the spreader 60 extends into the kerf 93 this predetermined distance, the holder 57 is adjusted for proper operation of the anti-kickback pawls 62 and the spreader 60. Thus, proper operation is automatically obtained quickly and easily by moving the holder 57 until the top plane of the workpiece is tangent to the bottom of the circle formed by the groove 95 or 96, and then locking it in place. The size of each of the pawls 62 is related to the radial distance between the groove 95 or 96 and the outer periphery of the spreader, such that the vertical distance between the axis of rotation of a pawl 62 and the workpiece is less than the length of the pawl when the holder 57 is properly adjusted. Since the pawls 62 substantially cannot pivot in a counter-clockwise direction, as viewed in FIG. 3, the pawl points tend to dig into the workpiece and prevent movement thereof when the workpiece tends to kickback or move in the direction opposite to that of the arrow.

Because the disk-shaped spreader 60 is rotatable about the supporting shaft 84, the friction between the workpiece and spreader 60 is greatly reduced. Such friction is further reduced because of the limited "play" or axial movement of the spreader 60 along the bushing 87.

Since the tool holder 57 is adjustably movable about an arc of a circle having a center at the center of rotation of blade 20, the auxiliary tool device 55, including the spreader 60 and the anti-kickback pawls 62, remains at the same distance from the saw blade 20 for different adjusted positions thereof. In this way, the spreader 60 and the pawls 62 are substantially equally effective over the adjustment range of the device 55. Also, with the illustrated holder 57 connected to the side of the guard 26 and the portion 66 extending radially outwardly from the arcuate portion 65, the spreader 60 and pawls 62 can be efficiently disposed very close to the saw blade 20 and therefore become operational after a relatively short amount of workpiece has been cut. Furthermore, the holder 47 does not substantially interfere with the operator's view of the cutting area or light reaching the cutting area.

The auxiliary tool device 59 may include anti-kickback pawls 62 without a spreader or with a spreader of different form from that shown in the drawings. Where the auxiliary tool device has a spreader it may be, for example, of the fixed or non-rotatable type if desired. Also, where other anti-kickback means are used, for example, on a separate holder, the tool device 59 may consist of only the spreader.

In the modified embodiment illustrated in FIGS. 5, 6, and 7 a saw assembly having a hollow upper guard or cover 100 is shown secured to a stationary housing collar 102 by means of a screw 104 connecting an integral extension 106 of the guard to the collar 102. In this embodiment the guard 100 is of the non-adjustable type although it could be of the adjustable type that is mounted for adjustable rotation.

The guard 100 includes an axially outer side 108 and a spaced axially inner side 110 connected together by a plurality of fastening elements or screws 112. The guard 100 covers the upper portion of a saw blade 114 that is mounted for rotation to a motor shaft 116. The blade 114 is shown disposed above table 118 on which is supported a workpiece 120 to be cut. The saw assembly in FIG. 5 is shown ripping the workpiece 120 which is adapted to be moved in the leftward direction as indicated by the arrow along a fence 122.

Mounted for adjustable movement on the guard side 110 is an auxiliary tool device 124 of modified construction. Device 124 includes an adjustable arcuate tool holder 126 supporting an auxiliary tool device 128 including a spreader 130 and pawls 132 on each side of the spreader. The tool device 128 is connected to the end portion of holder 126 by means of a bolt 134 and nuts 136. Tool device 128 is shown for illustration as identical to the tool device 59 of FIG. 1.

The tool holder 126 is shown as a flat arcuate member guided for arcuate movement. The holder 126 is slidable in an arcuate channel 138 having opposed arcuate walls 140 and 142 which guide the holder 126 for adjustable arcuate movement or circular movement about the axis of rotation of the saw blade 114. The channel 138 and walls 140 and 142 are shown as integral portions of the guard on the axially inner wall or blade side of the guard side 110. At the upper end of the holder 126 is a threaded member shown as a stud or bolt 144, preferably secure against rotation to the holder. The bolt 144 extends through an arcuate slot 146 in the guard side 110 which extends concentrically with the walls 140 and 142. A knob 148 threadedly receives the end portion of bolt 144. A washer 150, larger in diameter than the width of slot 146 is shown disposed between the wall 110 and knob 148.

Knob 148, when tightened in one direction, clamps the holder 126 between the head of bolt 144 and the knob to position the holder 126 and auxiliary tool device 128 in a predetermined position. When the knob 148 is loosened or turned in the opposite direction, the clamping pressure on the holder 126 is reduced and the holder is slidable in the channel 138 to a new selected position.

Since auxiliary tool device 124 is movable along a circle having a center substantially coincident with the center of the saw blade 114, the tool device 128 remains equally spaced from the saw blade for different adjusted positions.

While arcuate channels 67 and 146 formed in the guards 26 and 100 are shown in the drawings, other guide means for the tool holders 57 and 126 are possible. For example, a tool holder may be guided by an arcuate slot such as slot 146 in FIGS. 5, 6 and 7 rather than by a channel. In such case a pin (not shown) that is fixed to the holder and the screw 144 could be sized so as to be guided by the slot to thereby guide the holder, the slot being the guide means for the holder.

The embodiment shown in FIGS. 5, 6, and 7 can be readily adjusted using one hand since the knob 148 serves two functions, that of locking the tool assembly 124 and the holding means for the holder 126.

In view of the above, it will be seen that the several objects of the invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

I claim:

1. An auxiliary tool device for use in a tool assembly adapted to support a rotary tool for performing a work operation on a workpiece comprising:
   adjustable means;
   an auxiliary tool connected to said adjustable means adjacent the outer periphery of said rotary tool for engagement with the workpiece, said adjustable means being connected to said assembly and selectively movable to effect adjusting arcuate movement of said auxiliary tool whereby said auxiliary tool is adjustably movable substantially along an arc of a circle having a center at the axis of rotation of said rotary tool, said auxiliary tool comprising: spreader means; and
   anti-kickback means including a pawl engageable with the workpiece and disposed adjacent said spreader means, said spreader means being adapted to enter a kerf in a workpiece cut by said rotary tool and having a mark thereon spaced a predetermined distance from the periphery thereof, said distance being related to the size of said pawl whereby adjustment of said auxiliary tool such that said spreader extends into the kerf said predetermined distance ensures effective operation of said anti-kickback means.

2. An auxiliary tool device for a rotary saw assembly for cutting a workpiece adapted to be disposed on a table and having housing means for supporting a saw blade for rotation comprising:
   cover means adapted to receive a portion of the blade;
   adjustable support means movable in a plane parallel to the plane of said blade, said support means including a support member having a first arcuate portion and a second portion connected to said first portion and extending radially outwardly therefrom beyond the periphery of said blade;
   a tool supporting element extending parallel to the axis of rotation of said blade and connected to said second portion of said support means;
   auxiliary tool means connected to said tool supporting element so as to be supported radially outwardly of said blade and adapted to engage a workpiece during a cutting operation;
   connection means on said cover for connecting said support means thereto including releasable holding means for selectively permitting adjustable movement of said support means and said tool means and to hold said support means and said tool means in an adjusted position; and
   guide means on said cover for guiding said support means for adjustable movement substantially along an arc of said circle having a center coincident with the axis of rotation of said blade to thereby maintain said tool means substantially at the same distance from said axis for different adjusted positions thereof, said guide means including a channel for receiving said arcuate portion of said support means and having opposed arcuate side walls for guiding said support means for said adjustable movement.

3. In combination, a cover adapted to cover a portion of a power driven saw blade of a radial arm saw assembly, said assembly having a table for supporting a work piece, said cover having a wall portion with slot means therein, an auxiliary tool assembly, said auxiliary tool assembly including an auxiliary tool holder guided for adjustable sliding movement in said slot means, said tool holder being disposed adjacent to one side of said side wall portion, a workpiece engaging tool means connected to said holder radially outwardly of the saw blade, and a releasable locking means connecting said holder to said cover to lock said holder in a selected position and releasable to permit adjustable sliding movement of said holder, said locking means comprising a threaded member on said holding means extending through said slot means, and knob means adjacent the opposite side of said side wall portion and threadedly receiving said threaded member to releasably hold said holding means against relative movement to said side wall portion, said adjustable sliding movement being along an arc of a circle having a center substantially at the axis of rotation of the blade so that the distance between said tool means and the blade will remain constant for different adjusted positions of the tool means.

4. In a power driven rotary tool including a rotary saw assembly for cutting a workpiece and a guard disposed about at least a portion of said rotary saw, the improvement comprising an auxiliary tool device removably and adjustably mounted to said guard, said auxiliary tool device comprising a spreader and an anti-kickback means, said spreader having a mark thereon spaced a predetermined distance from the periphery thereof, said distance being related to the size of said anti-kickback means whereby adjustment of said auxiliary tool such that said mark is tangent to an upper surface of said workpiece ensures effective operation of said anti-kickback means.

5. The auxiliary tool device according to claim 4 wherein said spreader means comprises a rotatable circular member.

6. The auxiliary tool device according to claim 5 wherein said anti-kickback means comprises pivotal pawl means engageable with the workpiece.

7. The auxiliary tool device according to claim 6 further including guide means on a portion of said assembly, said adjusting means being guided for selective arcuate adjusting movement by said guide means, and releasable locking means on said portion for maintaining said adjusting means in a fixed adjusted position.

8. In a power driven rotary tool including a rotary saw assembly for cutting a workpiece and a guard disposed about at least a portion of said rotary saw, the improvement comprising an auxiliary tool device removably and adjustably mounted to said guard, said auxiliary tool device including a tool support having a first and a second end, said first end being attached to said guard by attaching means adapted for adjustable movement of said auxiliary tool device substantially along an arc of a circle having a center coincident with the axis of rotation of said rotary saw and a second end adapted to mount an anti-kickback means and a spreader thereto, said spreader including means for determining proper location for said auxiliary tool device with relation to said workpiece, and means for releasably holding said auxiliary tool device mounted along said first end of said attaching means.

9. The auxiliary tool device according to claim 8 wherein said releasable holding means comprises manually operable clamping means holding said support means against movement.

10. The auxiliary tool device according to claim 8 wherein said releasable holding means comprises plate means connected to said guard radially inwardly of the outer periphery of the saw blade and having a threaded opening therein, and threaded clamping means threadedly received in said opening, said support means extends between said cover and said plate means, said threaded clamping means being engageable with said support means to releasably hold the same in a fixed position.

11. The auxiliary tool device according to claim 9 wherein said spreader means comprises a circular disk rotatably connected with said tool support.

12. The auxiliary tool device according to claim 11 wherein said spreader is circular disk member rotatably mounted on said tool support in aligned relation with said blade to enter a kerf in a workpiece cut by said blade, said spreader being mounted on said supporting element for limited movement along said supporting element.

13. A rotary saw assembly, comprising:
a frame;
a table for supporting a workpiece mounted to said frame;
a saw blade mounted to said frame and adapted to assume a plurality of positions with respect to said table and said workpiece;
means for power driving said saw blade;
a guard mounted to said assembly and arranged to receive a portion of said saw blade;
an auxiliary tool mounted to said guard in sliding relationship thereto, said auxiliary tool comprising a tool support having a first and a second end, said first end being attached to said guard and adapted for adjustable movement of said auxiliary tool device substantially along an arc of a circle having a center coincident with the axis of rotation of said saw blade, and a spreader mounted to said second end, said spreader including means for determining proper position of said auxiliary tool; and
means for releasably locking said auxiliary tool in said proper position.

* * * * *